United States Patent
Jakob et al.

(10) Patent No.: US 6,923,605 B2
(45) Date of Patent: Aug. 2, 2005

(54) CLAMPING DEVICE

(75) Inventors: Ludwig Jakob, Kleinwallstadt (DE); Josef Greif, Friesenried (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 0 days.

(21) Appl. No.: 10/861,110

(22) Filed: Jun. 4, 2004

(65) Prior Publication Data

US 2005/0025600 A1 Feb. 3, 2005

Related U.S. Application Data

(63) Continuation of application No. PCT/EP02/13331, filed on Nov. 27, 2002.

(51) Int. Cl.$^7$ ................................................ B23C 5/26
(52) U.S. Cl. .................... 409/233; 408/239 R; 279/137; 279/23.1
(58) Field of Search ................................ 409/233, 232; 408/239 R, 239 A, 240; 82/160; 279/137, 900, 2.02–2.04, 23.1, 2.14

(56) References Cited

U.S. PATENT DOCUMENTS

| | | | |
|---|---|---|---|
| 3,568,566 A | | 3/1971 | Weidig |
| 4,668,137 A | | 5/1987 | Iwakura |
| 4,997,325 A | * | 3/1991 | Heel et al. ................. 409/233 |
| 5,346,344 A | * | 9/1994 | Kress et al. ............ 408/239 R |
| 5,409,322 A | * | 4/1995 | Horikawa et al. .......... 409/233 |
| 5,911,547 A | | 6/1999 | Klement |
| 6,419,430 B2 | * | 7/2002 | Hangleiter .................. 409/233 |
| 6,481,940 B2 | * | 11/2002 | Prust et al. ................. 409/233 |

FOREIGN PATENT DOCUMENTS

| | | | |
|---|---|---|---|
| DE | | 4138974 A1 * | 6/1993 |
| DE | | 29922642 U1 * | 2/2000 |
| EP | | 471197 A1 * | 2/1992 |
| WO | WO 94/08744 | | 4/1994 |

\* cited by examiner

*Primary Examiner*—Erica Cadugan
(74) *Attorney, Agent, or Firm*—Martin Fleit; Paul D. Bianco; Fleit Kain Gibbons Gutman Bongini & Bianco P.L.

(57) ABSTRACT

A clamping device for releasibly fixing one first machine part containing a cone-shape drilled shank to a second machine part containing a female bore. The clamping device comprises an axially movable clamping sleeve inside the second machine part and several clamping claws assigned to the clamping sleeve that are radially movable through axial movement of the clamping sleeve and that have a clamping surface so as to position the clamping claws against a cone-shaped inner surface of the cone-shaped drilled shank. In order to create an easily mountable and inexpensive additional fixing mechanism by means of which the first machine part can be secured in a simple and reliable manner even if the clamping elements have been released, a split taper socket with radially resilient clamping segments is disposed in the second machine part, enabling frictionally engaged fixing of the first machine part.

7 Claims, 4 Drawing Sheets

CLAMPING DEVICE

RELATED APPLICATION

This application is a continuation of International Patent Application PCT/EP02/13331, filed Nov. 27, 2002, the contents of which are here incorporated in their entirety; applicant claims the benefit of 35 USC 120.

BACKGROUND OF THE INVENTION

1. Field of the Invention

The invention pertains to a clamping device for removably holding a first machine part that is provided with the conical drilled shank on a second machine part that is provided with a taper bore.

2. Prior Art

A clamping device of this type is known from DE 299 22 642 U1. In this case, several clamping claws are combined into clamping segment grippers within a work spindle that is provided with a taper bore, wherein the front ends of said clamping claws contain oblique clamping surfaces that come in contact with corresponding clamping bevels on an annular groove in the interior of the conical drilled shank. Radially elastic holding grippers with holding tabs that extend parallel to the clamping claws are also arranged in the work spindle. Oblique holding surfaces that correspond to the clamping bevels are arranged on the individual holding tabs, wherein the oblique holding surfaces abut the clamping bevels of the conical drilled shank in the idle position of the holding tabs. Due to the additional holding tabs, the conical drilled shank is also held in position if the clamping claws have not yet come in contact with the clamping bevels or the clamping claws have already been released. In a clamping device of this type, the shape and position of the oblique holding surfaces on the holding tabs need to be exactly adapted to the corresponding clamping bevels of the conical drilled shank. This requires a precise manufacture and an exact installation. In addition, a comparatively high withdrawal force initially needs to be exerted when the conical drilled shank is removed from the work spindle, in order to move the holding tabs that positively engage in the annular groove radially inward in order to release the conical drilled shank. As soon as the oblique holding surfaces of the holding tabs are disengaged from the clamping bevels, the tool is suddenly released such that the holding force abruptly diminishes.

SUMMARY OF THE INVENTION

The invention is based on the objective of developing a clamping device with an inexpensive auxiliary holding arrangement that can be easily installed and makes it possible to secure the first machine part in a simple and reliable fashion, even if the clamping elements are released.

This objective is attained with a clamping device with the characteristics described. Practical additional development and advantageous embodiments of the invention are disclosed in the following description.

One significant advantage of the clamping device according to the invention is that the machine part provided with the conical drilled shank is reliably held by means of a simple frictional engagement. The gripping sleeve with the radially elastic gripping segments makes it possible to achieve a large contact surface that is distributed over the entire circumference. This not only results in secure retention, but also allows exact centering. The shape of the gripping segments does not have to be adapted to the clamping surfaces of the conical drilled shank in order for the gripping segments to engage in a corresponding annular groove. This simplifies the manufacture and installation of the clamping device. In addition, a shock-free insertion and removal of the machine part provided with the conical drilled shank can be achieved due to the frictional engagement between the gripping sleeve and a corresponding inside surface of the conical drilled shank.

The clamping device according to the invention is particularly suitable for automatically clamping tools on a machine tool, wherein the first machine part consists of a drilled-shank tool or a drilled-shank tool receptacle and the second component consists of a work spindle of the machine tool. The gripping sleeve reliably holds the tool in the work spindle even if the clamping segments are already moved into a release position in order to remove the tool. The clamping mechanism consequently can already be moved into a tool changing position during the displacement motion of the work spindle or released on the tool to be exchanged before it is taken hold of by an automatic tool gripper. This makes it possible to achieve faster tool changeover times. However, the clamping device may also be utilized for connecting other machine parts, e.g., for removably fixing a processing unit on a machine carriage or for connecting a tool clamping device to a machine table.

According to one practical embodiment of the invention, the gripping sleeve has several longitudinal slots that extend in the longitudinal direction of the gripping sleeve and are spaced apart from one another in the circumferential direction, wherein radially elastic gripping segments are formed between said longitudinal slots. A gripping sleeve of this type can be easily and inexpensively manufactured.

In another embodiment of the invention, the gripping sleeve consists of two parts that can be screwed together by means of a conical thread. The clamping surfaces are provided on the outer part that contains an internal thread. In this embodiment, the contact pressure of the gripping sleeve can be easily varied and adapted to the respective requirements by turning one of the two parts.

It is practical to provide the gripping sleeve with holding elements for axially securing the gripping sleeve on the clamping segments. Due to this measure, the installation and removal of the gripping sleeve together with the entire clamping device are simplified. However, the gripping sleeve can also be mounted in the second machine part.

BRIEF DESCRIPTION OF THE DRAWINGS

Other peculiarities and advantages of the invention are discussed below with reference to one preferred embodiment that is illustrated in the figures. The figures show.

DETAILED DESCRIPTION OF PREFERRED EMBODIMENTS OF THE INVENTION

Figure 1:
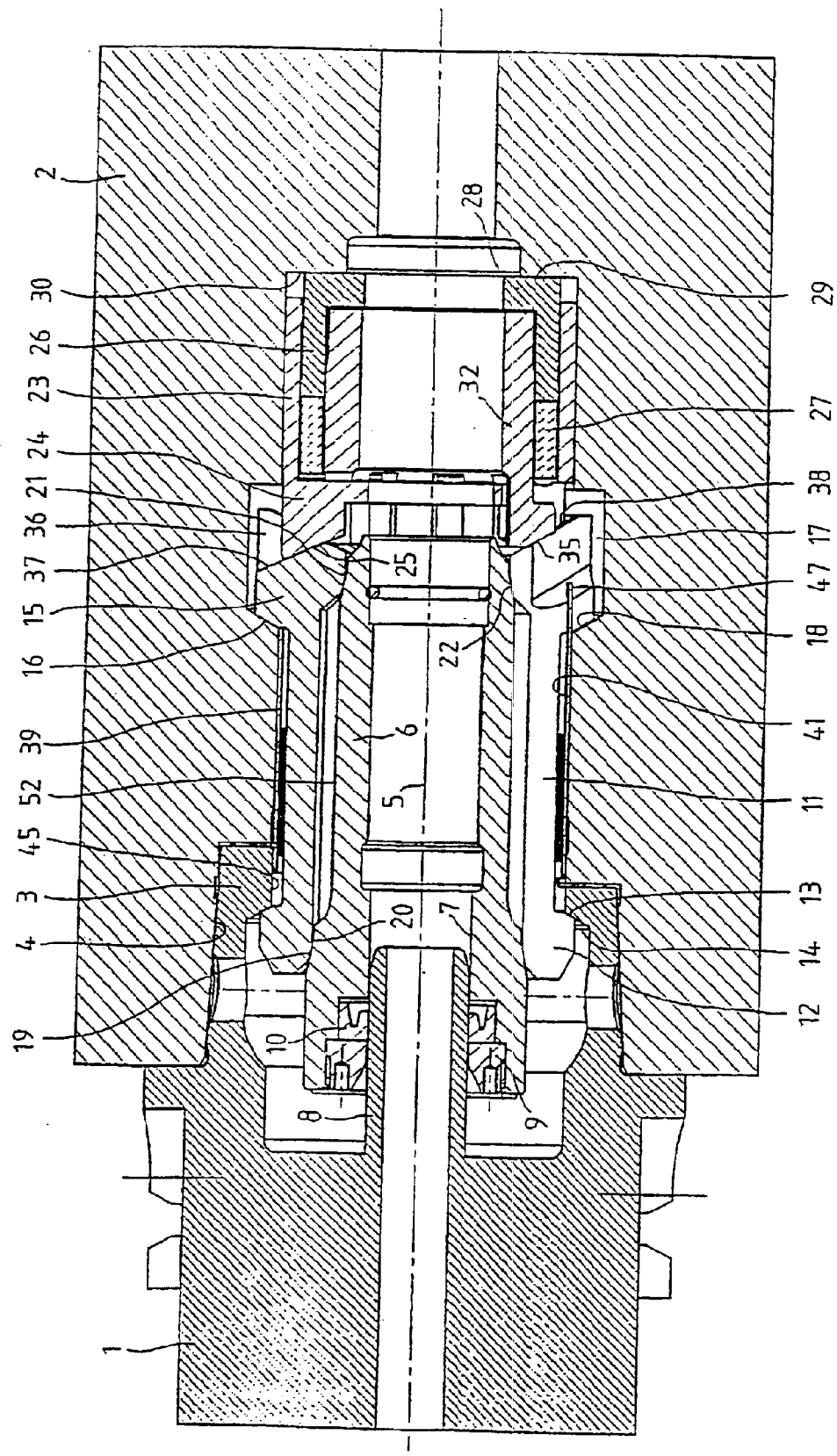
FIG. 1, a longitudinal section through a clamping device according to the invention in a clamping position.
Figure 2:
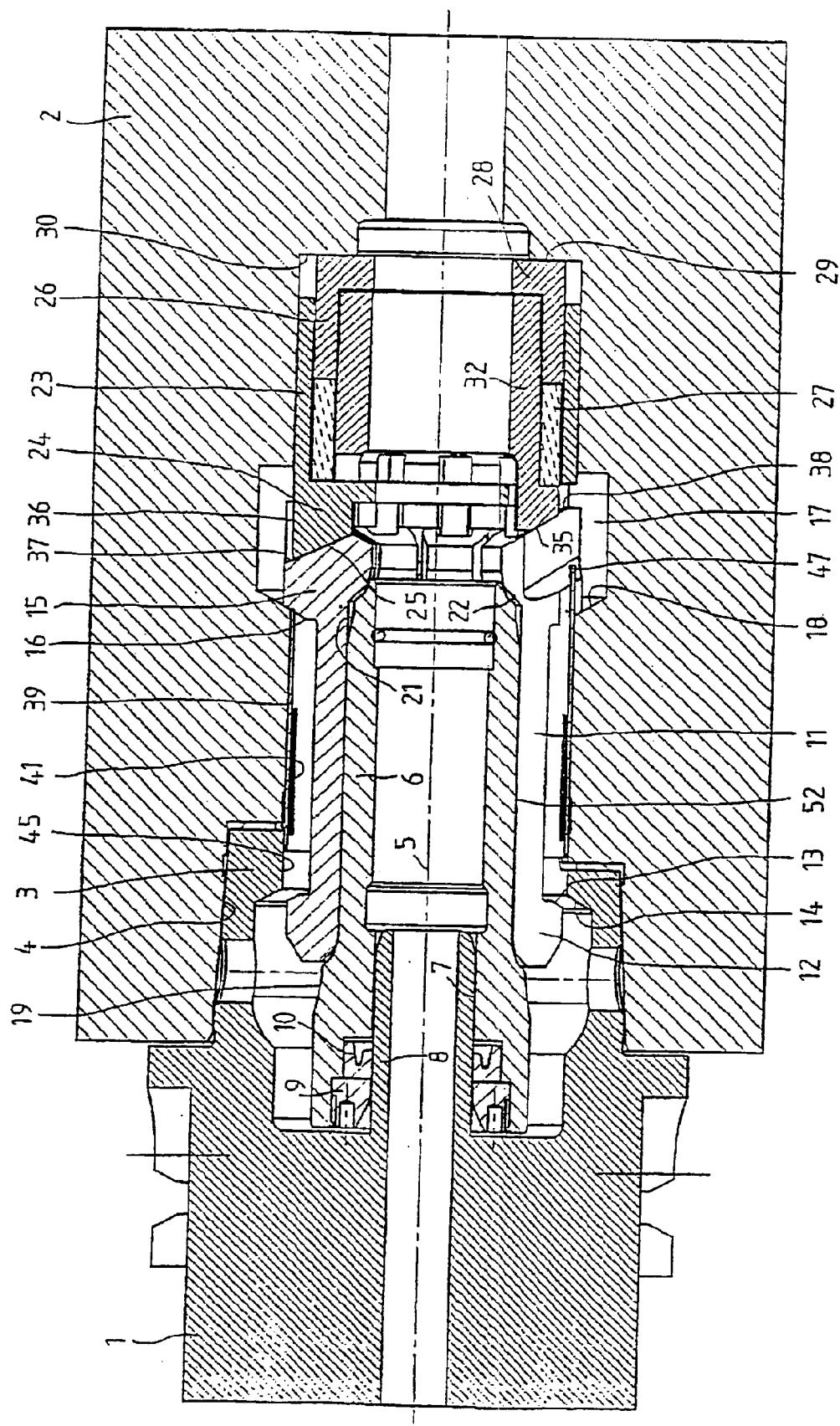
FIG. 2, a longitudinal section through a clamping device according to the invention in a release position.

FIGS. 1 and 2 show a clamping device for removably holding a drilled-shank tool 1 on the work spindle 2 of a machine tool, in a clamping position and a release position. The drilled-shank tool 1 has a conical drilled shank 3 that must engage with a corresponding taper bore 4 at the front end of the hollow-cylindrical work spindle 2.

A clamping sleeve 6 is arranged within the work spindle 2 concentric to its center axis 5, wherein said clamping sleeve is screwed to an actuating rod, not shown, and can be axially displaced between the rear clamping position shown in FIG. 1 and the front release position shown in FIG. 2 by means of this actuating rod. The front end of the clamping sleeve 6 that faces the conical drilled shank 3 contains a bore 7 for accommodating a central connecting peg 8 that is integrally formed on the drilled-shank tool and serves for supply of a processing fluid. The connecting peg 8 is sealed relative to the clamping sleeve 6 with a seal 10 that is arranged on the front end of the clamping sleeve 6 and secured by means of a ring 9.

Several clamping claws 11 that extend parallel to the center axis 5 are arranged on the outer side of the clamping sleeve 6 such that they are equidistantly spaced apart in the circumferential direction. In the embodiment shown, seven clamping claws 11 are concentrically arranged around the center axis 5. On their front end 12 that faces the conical drilled shank 3, the clamping claws 11 are provided with a radial thickening that has a first clamping surface 13 in the form of a conical surface section. In the clamping position shown in FIG. 1, this clamping surface 13 abuts a conical inside surface 14 on the inner side of the conical drilled shank 3. The conical inside surface 14 has the same angle of inclination relative to the longitudinal axis of the conical drilled shank 3 as the first clamping surface 13 of the clamping claws 11. On their radially widened rear end 15, the outer side of the clamping claws 11 contains a second clamping surface 16 that is inclined in the opposite direction relative to the front clamping surface 13. This second clamping surface serves to support the clamping claws 11 on a conical mating surface 18 that is arranged within an annular groove 17 of the work spindle 2. The second clamping surface 16 of the clamping claws 11 is also realized in the form of the conical surface section and has an angle of inclination that corresponds to that of the mating surface 18.

On the outer side of its front end that faces the conical drilled shank 3, the clamping sleeve 6 has first conical clamping surface regions 19 that abut a corresponding inside surface 20 on the front end 12 of the clamping claws 11. Second conical clamping surface regions 21 are arranged on the outer side of the rear end of the clamping sleeve 6 and abut a corresponding inside surface 22 on the rear end of the clamping claws 11. The clamping surface regions 19 and 21 of the clamping sleeve 6 and the corresponding inside surfaces 20 and 22 of the clamping claws 11 are adapted to one another in such a way that the clamping claws 11 can be displaced radially outward or inward in a position parallel to the center axis 5 of the work spindle 2 by subjecting the clamping sleeve 6 to an axial movement. With respect to other constructive details of the clamping claw arrangement, please consult European Patent Application EP 0 471 197 A1, to the disclosed content of which the inventors expressly refer.

Figure 3:
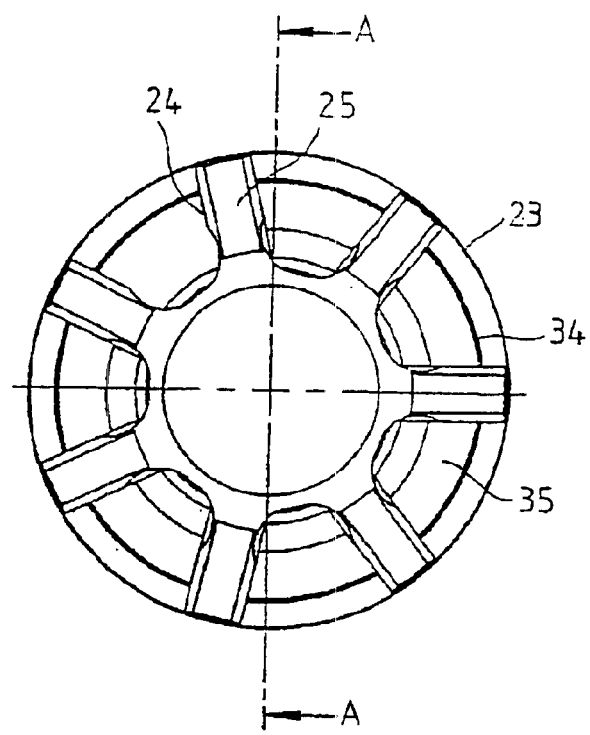
FIG. 3, a spacer of the clamping device according to the invention.
Figure 4:
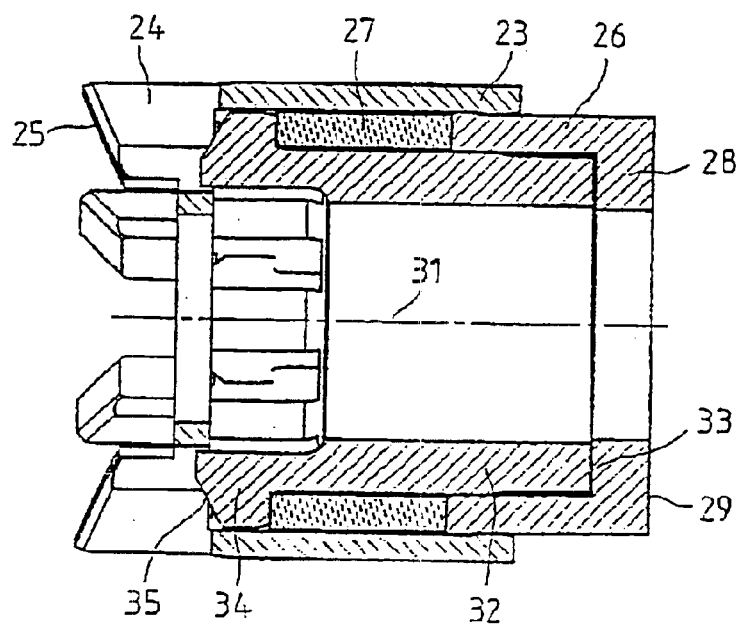
FIG. 4, the spacer according to FIG. 3 in the form of a longitudinal section along the line A—A in FIG. 3.

A spacer that is illustrated in greater detail in FIGS. 3 and 4 is arranged inside the work spindle 2 adjacent to the rear ends of the clamping claws 10. This spacer has a radially outer bushing-like holder 23 that has, on the end that faces the clamping claws 11, seven projections 24 with beveled end faces 25 that protrude in the axial direction. The holder 23 can be displaced on a bushing 26 that is installed such that it is subjected to the force of a pressure spring 27. The bushing 26 has an annular shoulder 28 at its rear end and abuts an annular surface 30 in the interior of the work spindle 2 with its rear end face 29. A sleeve 32 is arranged within the bushing 26 concentric to its longitudinal axis 31, wherein the rear end face 33 of said sleeve abuts the annular shoulder 28 and its front end has seven ring segments 34 with oblique contact surfaces 35 that protrude between the projections 24 of the holder 23.

According to FIG. 1, the projections 24 of the holder 23 engage in a slot 36 in the rear end of the clamping claws 11, and their beveled end face 25 abuts a correspondingly oblique mating surface 37 in the base of the groove 36. The sleeve 32 abuts a bevel 38 on the rear end of the clamping claws 11 with its oblique contact surfaces 35. The bevel 38 has a slope opposite to that of the oblique mating surface 37.

Figure 5:
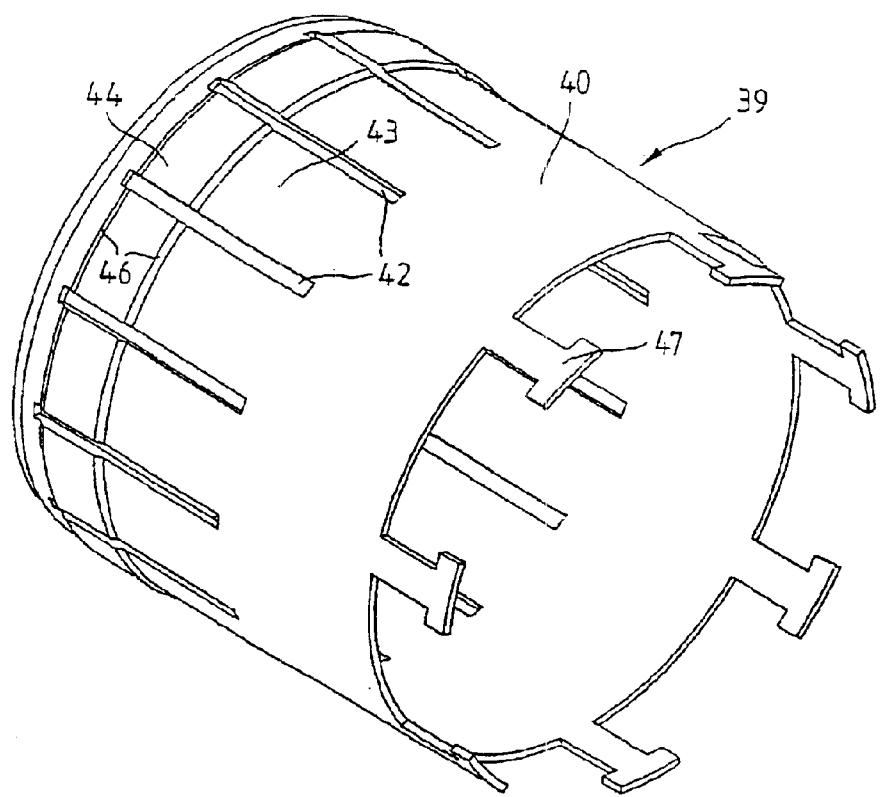
FIG. 5, a first embodiment of a gripping sleeve in an oblique view.

The gripping sleeve 39 that is illustrated in an oblique view in FIG. 5 is arranged radially outside the clamping claws 11 concentric to the center axis 5 of the work spindle 2. The gripping sleeve 39 has a rear cylindrical region 40 that is arranged in a corresponding bore 41 in the interior of the work spindle 2. The gripping sleeve 39 has several longitudinal slots 42 that extend in its longitudinal direction and are equidistantly distributed in the circumferential direction, with gripping segments 43 elastic in the radial direction being formed between said longitudinal slots. Relative to the rear region, the gripping segments 43 have an elevated clamping surface 44 that comes in contact with a cylindrical section 45 on the inner side of the conical drilled shank 3. The clamping surfaces 44 of the gripping segments 43 form an annular surface that is interrupted by the longitudinal slots and abuts the cylindrical section 45 when a drilled-shank tool 1 is inserted. In the region of the clamping surfaces 44 that are uniformly distributed over the circumference, the outside diameter of the gripping sleeve 39 is larger than the inside diameter of the cylindrical section 45 when the gripping segments 43 are not pressed inward. Consequently, the elastic gripping segments 43 abut the cylindrical section 45 with their clamping surfaces 44 under tension when a drilled-shank tool 1 is inserted. This means that the drilled-shank tool 1 is also held within the work spindle 2 by means of a frictional engagement when the clamping claws 11 are released. Beveled ramp surfaces 46 are provided on the edges of the clamping surfaces 44 in order to simplify insertion and removal of the drilled-shank tool 1. The gripping sleeve 39 also has seven T-shaped curved projections 47 at its rear end that are equidistantly spaced apart in the circumferential direction. These projections engage behind the clamping claws 11 with their lateral protrusions and thusly ensure that the gripping sleeve 39 is axially fixed.

Figure 6:
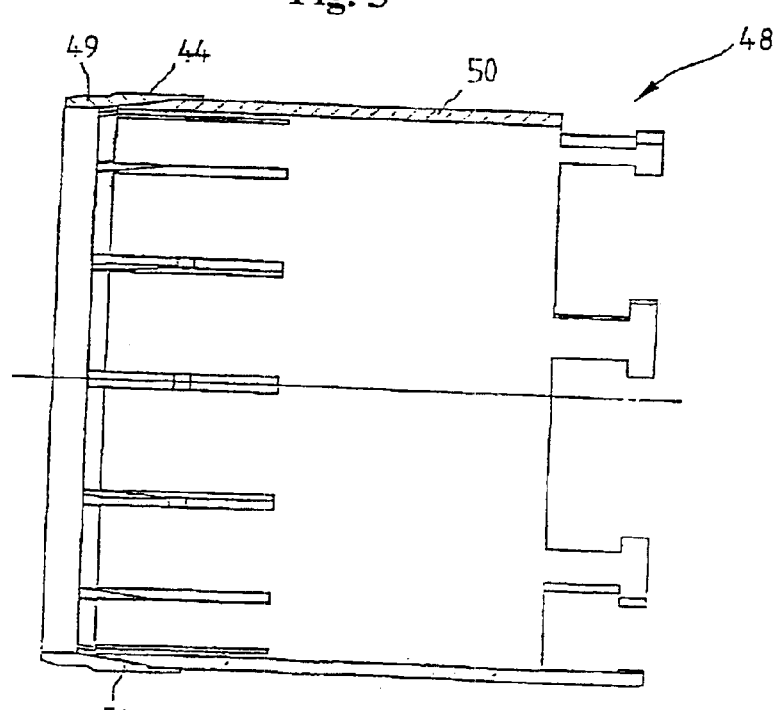
FIG. 6, a second embodiment of a gripping sleeve in the form of a side view section.

A second embodiment of the gripping sleeve 48 is illustrated in FIG. 6 and consists of two slotted parts 49 and 50 that can be displaced relative to one another and are screwed together by means of a conical thread 51. Clamping surfaces 44 are provided on the front part 49 that contains the internal thread, and T-shaped projections 47 are provided on the rear part 50 that contains the external thread. In this embodiment, the outside diameter of the gripping sleeve 48 can be varied in the region of the clamping surfaces 44 by simply turning one of the two parts 49 or 50. This means that the clamping force can be easily adapted to the respective requirements.

The clamping device according to the invention functions as described below:

When the clamping sleeve 6 is displaced from the clamping position shown in FIG. 1 into the release position shown in FIG. 2 by means of a not-shown actuating rod, the clamping claws 11 are pressed radially inward by the oblique end faces 25 of the holder 23 that is acted upon by the pressure spring 27, until they abut a cylindrical center part 52 of the clamping sleeve 6. In this position, the conical drilled shank 3 is also released from the front ends 12 of the clamping claws 11. However, the conical drilled shank 3 is still held by the gripping sleeve 39, the radially elastic gripping segments 43 of which make contact with their contact surfaces 44 under pressure on the cylindrical section 45. The drilled-shank tool 1 consequently is also securely held and prevented from falling out when the clamping claws are released.

This means that the clamping mechanism can already be released on the drilled-shank tool 1 before an intervention of an automatic tool changing device occurs. This makes it possible to reduce the tool changeover time.

What is claimed is:

1. Clamping device for removably holding a first machine part provided with a conical shank on a second machine part provided with a tapered bore, wherein said clamping device comprises a plurality of clamping claws having clamping surfaces to contact a shoulder formed on an inside surface of the conical shank, a clamping sleeve being mounted for axial displacement in the second machine part, which causes radial displacement of the clamping claws to effect one of clamping and release, an elongated gripping sleeve mounted in the second machine part, said gripping sleeve having a forward end and a rear end, a plurality of longitudinal slots circumferentially spaced extending from the forward end of the gripping sleeve to define a plurality of radially elastic gripping segments having free ends with contact surfaces that are elevated relative to an external surface of the gripping sleeve, which contact surfaces form an annular surface that is interrupted by the longitudinal slots, said contact surfaces contacting a cylindrical inside surface within the conical shank in a frictionally engaged fashion.

2. Clamping device for removably holding one of a tool and tool receptacle provided with a shank on a machine tool provided with a complementary bore, wherein said clamping device comprises a plurality of clamping claws having clamping surfaces to contact a shoulder formed on an inside surface of the one of a tool and tool receptacle, a clamping sleeve being mounted for axial displacement in the machine tool, to cause radial displacement of the clamping claws and effect one of clamping and release, an elongated gripping sleeve mounted in the machine tool, said gripping sleeve having a forward end and a rear end, a plurality of longitudinal slots circumferentially spaced extending from the forward end of the gripping sleeve to define a plurality of radially elastic gripping segments having free ends with contact surfaces that are elevated relative to an external surface of the gripping sleeve, which contact surfaces form an annular surf cc that is interrupted by the longitudinal slots, said contact surfaces contacting a cylindrical inside surface within the one of a tool and tool receptacle in a frictionally engaged fashion.

3. Clamping device according to claim 2 wherein the outside diameter of the gripping sleeve in the region of contact with the inside surface of the one of the tool and tool receptacle is larger than the inside diameter of the one of the tool and tool receptacle prior to insertion of the one of the tool and tool receptacle into the machine tool.

4. Clamping device according to claim 2 wherein the contact pressure of the gripping segments is adjustable.

5. Clamping device according to claim 2 wherein the gripping sleeve is composed of two parts displaceable relative to one another.

6. Clamping device according to claim 5 wherein the two parts are connected by means of a conical thread.

7. Clamping device according to claim 2 wherein the gripping sleeve has a plurality of holding projections at its rear end that are spaced apart in the circumferential direction, said holding projections serving to axially fix the gripping sleeve in the machine tool.

* * * * *